US010395279B1

(12) United States Patent
DeLaet et al.

(10) Patent No.: US 10,395,279 B1
(45) Date of Patent: Aug. 27, 2019

(54) SYSTEM AND METHOD FOR IN-GAME CALENDAR-BASED ITEM PROMOTION

(71) Applicant: Electronic Arts Inc., Redwood City, CA (US)

(72) Inventors: Michael C. DeLaet, Foster City, CA (US); Robert Oshima, Orinda, CA (US); Kellen Christopher Smalley, Pleasanton, CA (US)

(73) Assignee: Electronic Arts Inc., Redwood City, CA (US)

( * ) Notice: Subject to any disclaimer, the term of this patent is extended or adjusted under 35 U.S.C. 154(b) by 821 days.

(21) Appl. No.: 14/247,946

(22) Filed: Apr. 8, 2014

(51) Int. Cl.
*G06Q 30/02* (2012.01)
*G06Q 10/10* (2012.01)
*A63F 13/30* (2014.01)

(52) U.S. Cl.
CPC ......... *G06Q 30/0269* (2013.01); *A63F 13/12* (2013.01); *G06Q 10/1095* (2013.01); *G06Q 30/0264* (2013.01)

(58) Field of Classification Search
None
See application file for complete search history.

(56) References Cited

U.S. PATENT DOCUMENTS

| | | | |
|---|---|---|---|
| 9,044,682 B1* | 6/2015 | Rappaport | A63F 13/12 |
| 9,623,335 B1* | 4/2017 | Kim | G06Q 30/0224 |
| 2008/0270240 A1* | 10/2008 | Chu | G06Q 10/06375 |
| | | | 705/14.11 |
| 2009/0186700 A1* | 7/2009 | Konkle | A63F 13/87 |
| | | | 463/42 |
| 2010/0174593 A1* | 7/2010 | Cao | A63F 13/12 |
| | | | 705/14.12 |
| 2012/0110477 A1* | 5/2012 | Gaume | G06Q 50/01 |
| | | | 715/757 |
| 2012/0284637 A1* | 11/2012 | Boyer | G06Q 10/109 |
| | | | 715/751 |
| 2013/0198273 A1 | 8/2013 | Vago et al. | 709/203 |
| 2014/0278671 A1* | 9/2014 | Leonhardt | G06Q 10/1095 |
| | | | 705/7.19 |
| 2015/0005054 A1* | 1/2015 | Smalley | A63F 13/69 |
| | | | 463/25 |

OTHER PUBLICATIONS

Event calendar—WoWWiki—Your guide to the World of Warcraft URL: http://www.wowwiki.com/event_calendar [Retrieved of Feb. 6, 2014].
Calendar—WoWWiki—Your guide to the World of Warcraft URL: http://www.wowwiki.com/Calendar [Retrieved Feb. 6, 2014].

* cited by examiner

*Primary Examiner* — Alan S Miller
*Assistant Examiner* — Alan Torrico-Lopez
(74) *Attorney, Agent, or Firm* — Knobbe, Martens, Olson & Bear, LLP

(57) ABSTRACT

A method and system for in-game calendar-based item promotion for use by groups of users in the game, such as alliances. The users have a shared calendar in which dates and times are scheduled for group activities and additional relevant information may be entered. The system and method include ways of identifying scheduled dates and times and activities and promoting items which may be helpful for the scheduled activities. The users are encouraged to purchase the promoted items. In addition, certain actions may be recommended to the users based on the scheduled dates, times, and activities and associated information. Scheduling incentives may be used to encourage users to play the game at preferred dates and/or times.

22 Claims, 5 Drawing Sheets

SYSTEM AND METHOD FOR IN-GAME CALENDAR-BASED ITEM PROMOTION

FIELD OF THE DISCLOSURE

This disclosure relates to systems and methods for in-game calendar-based item promotion.

BACKGROUND

In many conventional strategy based games it is common for numbers of users to group together to form alliances. These alliances allow users to have interactions with other users and also enables them to share items and actions in the games. Within an alliance users may have a shared calendar where they may schedule times and dates for taking actions in the game. In this way the users can "meet" at a specific time and date to carry out the planned action.

For the game provider, the information in the shared calendar relating to when users are getting together to carry out an action offers an opportunity to interface with the users concerned. However, existing implementations of shared calendars do not take advantage of this opportunity to engage with the users. Accordingly, alternative approaches regarding shared calendars may increase sales of virtual goods and incentivize action at preferred dates and times while enhancing the gameplay experience for users.

SUMMARY

One aspect of the disclosure relates to a system for in-game calendar-based item promotion. In exemplary implementations, dates and times input by groups of users into shared calendars may be used to schedule promotional offers for the sale of virtual items to the groups. The nature of the promotional offers may be based at least in part on information provided by the users in the shared calendars in association with the input dates and times. Incentives may encourage users to schedule activities at desired dates and times. The system may include one or more processors configured to execute computer program components. The computer program components may include a game component, a calendar component, a promotion component, an offer component, a shop component, a user component, a recommendation component, a scheduling incentive component, and/or other components.

The game component may be configured to execute an instance of a multiplayer online game to facilitate participation in the game by users via client computing platforms. The game component may be configured to implement in-game actions in the instance of the game in response to action requests for the in-game actions input by the users to the client computing platforms. The game component may be further configured to facilitate multiple users to participate cooperatively in the online game at the same time.

The calendar component may be configured to manage a shared calendar that is accessible by a group of users to schedule dates and times at which at least a subset of the group of users intend to participate cooperatively in specific activities within the game.

The promotion component may be configured to determine promotional offers to sell virtual items usable in the game that are to be extended to users in the group of users based on the scheduled dates and times for specific activities.

The offer component may be configured to effectuate presentation of the determined promotional offers to the users in the group of users.

The shop component may be configured to effectuate presentation to the users of a shop interface through which users can accept presented offers to sell virtual items usable in the online game to the users, the presented offers comprising the determined promotional offers.

The user component may be configured to manage inventories of virtual items under the control of the users, such inventories including a first inventory of one or more virtual items under control of a first user in the online game, wherein responsive to the first user accepting one of the determined promotional offers, the user component is configured to add a virtual item in the accepted offer to the first inventory.

In some implementations, information may be associated with the scheduled dates and times including at least one of an action to be taken, a number of users participating in the action, and one or more specific users participating in the action.

In some implementations, the information associated with the scheduled dates and times may include the action to be taken and the promotion component may be configured to determine the promotional offers based on the action to be taken.

In some implementations, the information associated with the scheduled dates and times may include one or more specific users participating in the action and the offer component may be configured to present the determined promotional offers only to the specific users.

In some implementations, the information associated with the scheduled dates and times may include one or more specific users participating in the action, and the offer component may be configured to effectuate presentation of at least one of the determined promotional offers only to certain of the specific users.

The recommendation component may be configured to recommend an action to be taken by the user based on the information associated with the scheduled dates and times. The offer component may be configured to time presentation of the determined promotional offers based on the scheduled dates and times.

The scheduling incentive component may be configured to provide an incentive for users to schedule activities on a particular calendar day and/or at a particular time. The incentive may dynamically change depending on at least one of the number of users that participate in the scheduled activity, the specific users that participate in the scheduled activity, the type of activity, and the percentage of users that committed to participate in the activity that actually participate in the activity.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
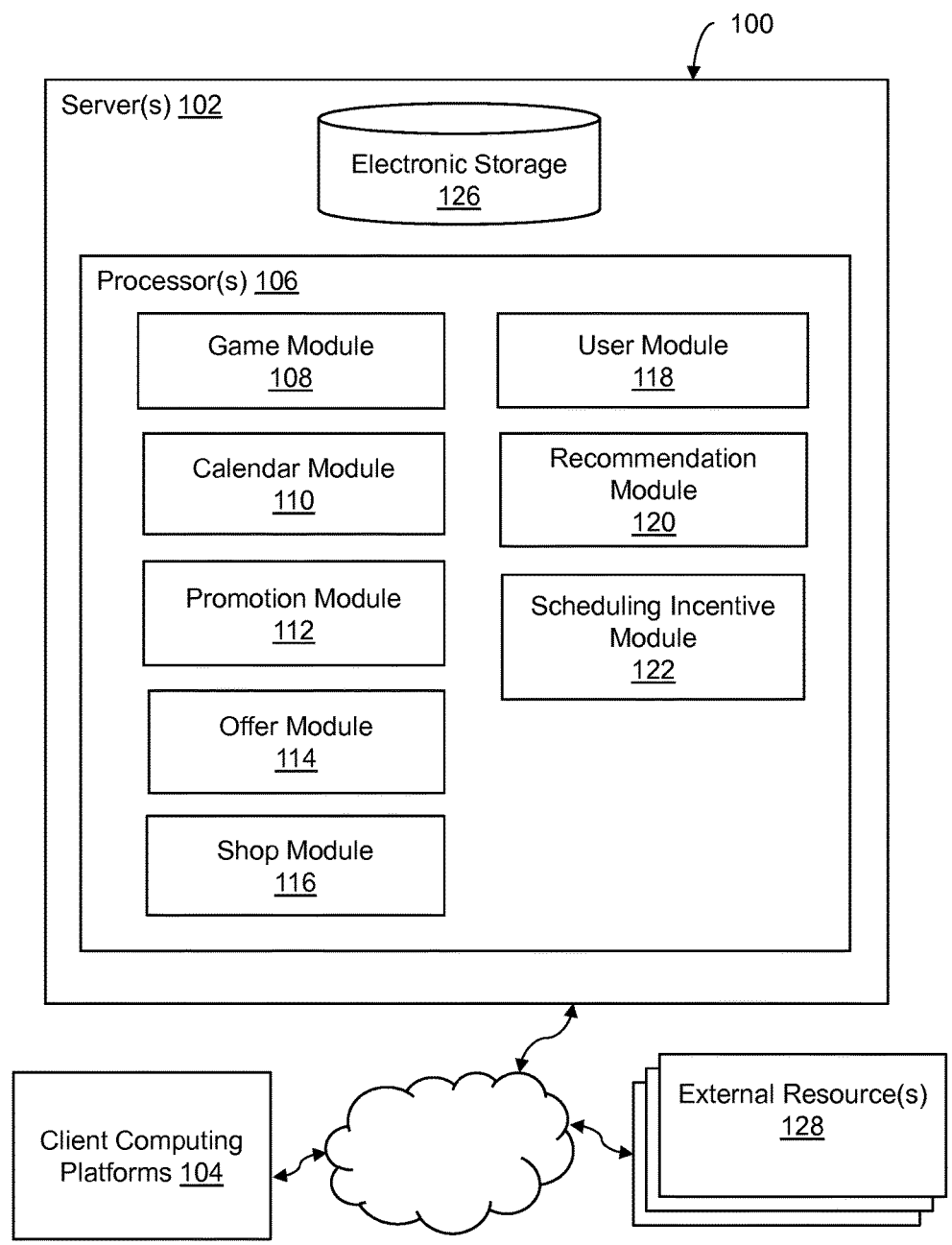
FIG. 1 illustrates a system configures to facilitate an in-game calendar-based item promotion, in accordance with one or more implementations.

FIG. 1 illustrates a system 100 configured to provide a virtual space to users. System 100 is only one example of a suitable computing environment and is not intended to suggest any limitation as to the scope of use or functionality of the features described herein. In this disclosure, an online multiplayer game may have a shared calendar for use by groups of users such as alliances, or other affiliations (e.g., guilds, clans, etc.). Information entered in the calendar by the users may be utilized to present targeted promotional offers for the sale of virtual items to the users. The information may be used to incentivize activity on desired dates/times and to recommend courses of action the users should undertake, all to enhance gameplay and engagement and monetization. Providing the virtual space may include hosting the virtual space over a network. In some implementations, system 100 may include one or more servers 102. The server(s) 102 may be configured to communicate with one or more client computing platforms 104 according to a client/server architecture. The users may access system 100 via client computing platforms 104, for instance, to engage in one or more games.

The server(s) 102 may be configured to execute one or more computer program components. The computer program components may include one or more of a game component 108, a calendar component 110, a promotion component 112, an offer component 114, a shop component 116, a user component 118, a recommendation component 120, a scheduling incentive component 122, and/or other components.

The game component 108 may be configured to execute an instance of a multiplayer online game to facilitate participation in the game by users via client computing platforms. The game component 108 may be configured to implement in-game actions in the instance of the game in response to requests for in-game actions input by the users to the client computing platforms. The game component may be further configured to facilitate multiple users to participate cooperatively in the online game at the same time.

The game may be provided within a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user-controlled element. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104.

Communications may be routed to and from the appropriate users through server(s) 102.

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The calendar component 110 may be configured to manage a shared calendar that is accessible by a group of users to schedule dates and times at which at least a subset of the group of users intend to participate cooperatively in specific activities within the game. In implementations, information may be associated with the scheduled dates and times such as an action to be taken, a number of users participating in the action, and/or one or more specific users participating in the action, etc.

The calendar may include dates and times and may be organized in months or other appropriate periods. The calendar may be accessed by the user and by anyone with whom the user shares the calendar. The calendar may be used to schedule activities for either the user alone or for a group of users. A group of users may make up an alliance, guild, club, circle of friends, community group, and/or any other type of group. A common type of user group in online games is an alliance, which is used as an exemplary type of group herein, and should be understood to be interchangeable with other types of groups where it appears. In the case of a user being part of an alliance, the alliance may have a shared calendar just for members of the alliance or may link all the members' calendars together to share information that is common to the alliance, so that it can be seen on the calendars of all alliance members. In this way, an alliance may schedule times and dates when they intend to "meet" in the virtual space and engage in an activity in the game. For example, the alliance may schedule a battle with a rival alliance and invite all alliance members to attend to ensure the highest chance of success in the battle. In addition, the game provider may be able to determine when an alliance has scheduled a meeting based on the shared calendar or calendars.

Knowledge of the intended activity and information related thereto may offer the game provider the opportunity to determine if the alliance might need items for the scheduled activity. The game provider may then promote items for sale which may be useful for the activity. For example, in the case of a battle, the game provider may promote and offer ammunition, a new weapon, troops, armor and/or any other item which might be useful for the action. The items that are promoted and offered may be determined by such information as users' profiles, an alliance profile, the activity scheduled, history of the activity in other instances of the game and what items were used, users' inventories, and/or any other appropriate criteria.

The calendar component 110 may be driven only by a calendar per se or in other implementations may be based in full or in part on other forms of communication between alliance members. For example the content of mail, text, or chat messages that pass between users within the system may be determined and used to identify scheduled events and/or information associated therewith.

The promotion component 112 may be configured to determine promotional offers to sell virtual items usable in the game that are to be extended to users in the group of users based on the scheduled dates and times for specific activities. In implementations, the promotion component may use the calendar component 110 to identify a scheduled event which may have revenue generating potential. The promotion component may analyze the scheduled activity and associated information such as participating user information to determine a promotional offer for an item or items which could be promoted to a user or users for the scheduled activity in question. The promotional offers may be determined at least in part based on information associated with scheduled dates and times, such as an action to be taken and/or one or more specific users participating in the action.

The offer component 114 may be configured to effectuate presentation of the determined promotional offers to the users in the group of users. In implementations, the offer component is configured to effectuate presentation of at least one of the determined promotional offers only to certain specific users based on information associated with scheduled dates and/or times that includes one or more specific users participating in an action. In implementations, having determined a promotional offer for the item or items with promotion component 112, the game provider may present the determined offer(s) to the user or users through offer component 114. The timing of the presentation of the determined offer(s) may be based on the schedule dates and/or times. Offers can be presented, for example, before the scheduled activity or at the time of the activity when participating alliance members are coming together. The offer may be made by means of a message, an email, a popup, an advertisement associated with the game, an entry in a calendar or any other type of communication. The offer may be made to some of or all of the members in the alliance (or other group). The choice of who the offer is made to may be based on user profiles, alliance/group profiles, amount of real world money spent in the virtual space, the membership of alliances and how the alliance users interface with each other and the game, the shared calendar used by alliance members to schedule events, items in a user's inventory, items a user or alliance may need for an action, and/or other activity or group parameters.

The shop component 116 may be configured to effectuate presentation to the users of a shop interface through which users can accept presented offers to sell virtual items usable in the online game to the users, the presented offers comprising the determined promotional offers. In implementations, users may purchase through the shop interface a virtual item which has been offered for sale in a promotional offer determined by the promotional component 112 and presented by the offer component 114. The shop interface may include various items for sale, prices and promotional offers, discounts for certain items or for multi-purchase items, and/or any other pricing information associated with items for sale. The user may purchase items through the shop interface using real currency or credits or virtual currency associated with game. Payment may be made through a user account, credit or debit cards, bank transfer and/or any other method of payment.

The user component 118 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, inventory information which indicates items that re possessed by the user, a client computing platform identification associated with a user, a phone number associated with a user, and/or other information related to users. In addition, the information may include details of membership of one or more alliances. Within the information relating to alliances there may be details of scheduled events for the alliance which may be based on a shared calendar. The scheduled events may relate to specific actions the alliance is intending to engage in, such as a specific battle or competition.

The user component 118 may be configured to manage inventories of virtual items under the control of one or more users, the inventories including a first inventory of one or more virtual items under control of a first user in the online game. The user component 118 may be configured to add a virtual item in a determined promotional offer to the first inventory when the first user accepts the offer, for example through the shop interface.

The recommendation component 120 may be configured to recommend an action be taken by the user based on the information associated with the scheduled dates and times. Thus, in implementations, recommendation component may recommend that a group of users change a scheduled activity based on information about the users planning to participate in the activity, for example to appropriately increase or decrease the difficulty of the activity, and/or recommend additional complementary activities to the group of users or a subset thereof to, for example, assist the users in accomplishing the scheduled activity. The recommendation component may recommend that a user purchases an item before an alliance meets to take the scheduled activity. For example, the user may be recommended to buy more ammunition if their inventory of ammunition is low and the activity to be engaged in by the users is likely to use plenty of ammunition. The recommendation can take other forms, such as suggesting the user joins an alliance, that the user or users in an alliance reschedule an event to enable them to make use of an offer that applies at a certain time or date, or any other action which might impact the game.

Scheduling incentive component 122 may be configured to provide an incentive for users to schedule activities on a particular calendar day and/or at a particular time. In implementations, the scheduling incentive component may be used alone or in conjunction with the recommendation component 120 to provide users with an incentive if they schedule activities for a particular time and/or date. The incentive may be, for example, a discount if the users schedule an activity on Tuesday rather than Wednesday. This may be advantageous to the game provider as, for example, less users may tend to play on Tuesdays than on Wednesdays and a balanced user load may be desirable.

In some implementations, the incentive may dynamically change depending on at least one of the number of users that participate in the scheduled activity, the specific users that participate in the scheduled activity, the type of activity, and the percentage of users that committed to participate in the activity that actually participate in the activity. For example, if many players indicate an intention to participate but few actually participate, the incentive may be reduced to discourage that behavior, which reduces the game provider's ability to predict the users' activities based on information input into shared calendars. Similarly, if low-engagement users participate, the incentive may be increased to encourage such users to participate in the future.

In some implementations, the server 102, client computing platforms 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information, hosts and/or providers of virtual environments outside of system 100, external entities participating with system 100, and/or other resources. In some implementations, some or all of the functionality attributed herein to external resources 128 may be provided by resources included in system 100.

Server 102 may include electronic storage 126, one or more processors 106, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 126 may comprise non-transitory storage media that electronically stores information. The electronic storage media of electronic storage 126 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor 106, information received from server 102, information received from client computing platforms 104, and/or other information that enables server 102 to function as described herein.

Processor(s) 106 is configured to provide information processing capabilities in server 102. As such, processor 106 may include one or more of a digital processor, an analog processor, a digital circuit designed to process information, an analog circuit designed to process information, a state machine, and/or other mechanisms for electronically processing information. Although processor 106 is shown in FIG. 1 as a single entity, this is for illustrative purposes only. In some implementations, processor 106 may include a plurality of processing units. These processing units may be physically located within the same device, or processor 106 may represent processing functionality of a plurality of devices operating in coordination. The processor 106 may be configured to execute components 108, 110, 112, 114, 116, 118, 120, and 122. Processor 106 may be configured to execute components 108, 110, 112, 114, 116, 118, 120, and 122 by software; hardware; firmware; some combination of software, hardware, and/or firmware; and/or other mechanisms for configuring processing capabilities on processor 106. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although 108, 110, 112, 114, 116, 118, 120, and 122 are illustrated in FIG. 1 as being implemented within a single processing unit, in implementations in which processor 106 includes multiple processing units, one or more of components 108, 110, 112, 114, 116, 118, 120, and 122 may be implemented remotely from the other components. The description of the functionality provided by the different components 108, 110, 112, 114, 116, 118, 120, and 122 described below is for illustrative purposes, and is not intended to be limiting, as any of components 108, 110, 112, 114, 116, 118, 120, and 122 may provide more or less functionality than is described. For example, one or more of components 108, 110, 112, 114, 116, 118, 120, and 122 may be eliminated, and some or all of its functionality may be provided by other ones of components 108, 110, 112, 114, 116, 118, 120, and 122. As another example, processor 106 may be configured to execute one or more additional components that may perform some or all of the functionality attributed below to one of components 108, 110, 112, 114, 116, 118, 120, and 122.

Figure 2:
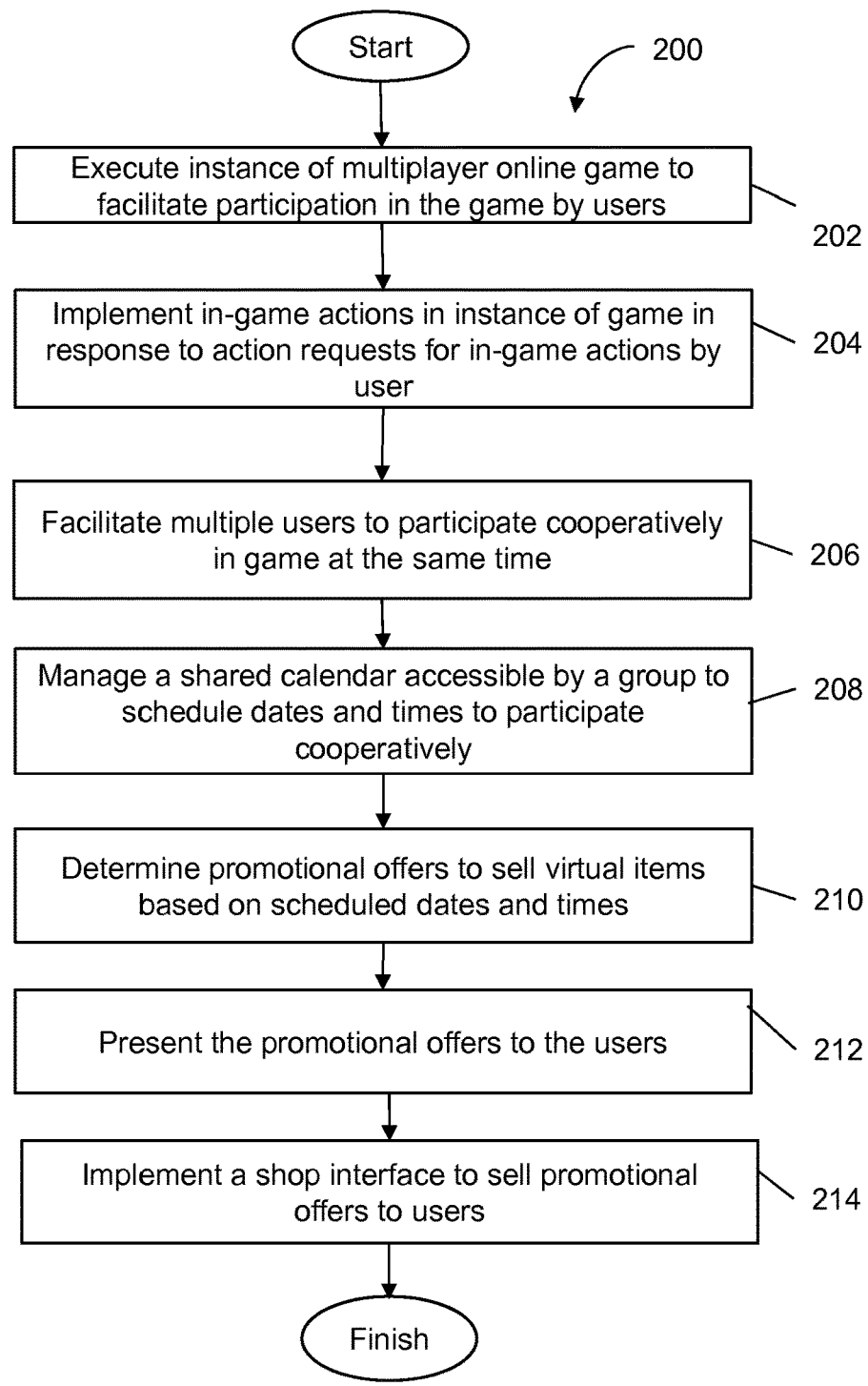
FIG. 2 illustrates a method for in-game calendar-based item promotion, in accordance with one or more implementations.

FIG. 2 illustrates a method for in-game calendar-based item promotion 200. The operations of the method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a multiplayer online game may be executed to facilitate participation in the game by users. Operation 202 may be performed by a game component that is the same as or similar to game component 108, in accordance with one or more implementations.

At an operation 204, in-game actions may be implemented in the instance of the game in response to action requests by the users. The in-game actions may include the user moving user-controlled elements, cooperating with other users carrying out cooperative actions, etc. Operation 204 may be performed by a game component that is the same as or similar to game component 108, in accordance with one or more implementations.

At an operation 206, cooperative participation of multiple users in the game at the same time is facilitated. The multiple users may be part of an alliance who cooperate in taking particular actions in the game. Operation 206 may be performed by a component that is the same as or similar to game component 108, in accordance with one or more implementations.

At an operation 208, a shared calendar may be managed, which is accessible to a group to schedule dates and times at which at least a subset of the group of users intend to participate cooperatively in specific activities within the game. Operation 208 may be performed by a component that is the same as or similar to calendar component 110, in accordance with one or more implementations.

At an operation 210, promotional offers to sell virtual items usable in the game that are to be extended to users in the group of users may be determined. These promotional offers may be based on the scheduled dates and times for specific activities. Operation 210 may be performed by a component that is the same as or similar to promotion component 112, in accordance with one or more implementations.

At an operation 212, the determined promotional offers may be presented to the users in the group of users. Operation 212 may be performed by a component that is the same as or similar to offer component 114, in accordance with one or more implementations.

At an operation 214, a shop interface may be presented to users through which they can accept the presented promotional offers. Operation 214 may be performed by a component that is the same as or similar to shop component 116, in accordance with one or more implementations.

Figure 3:
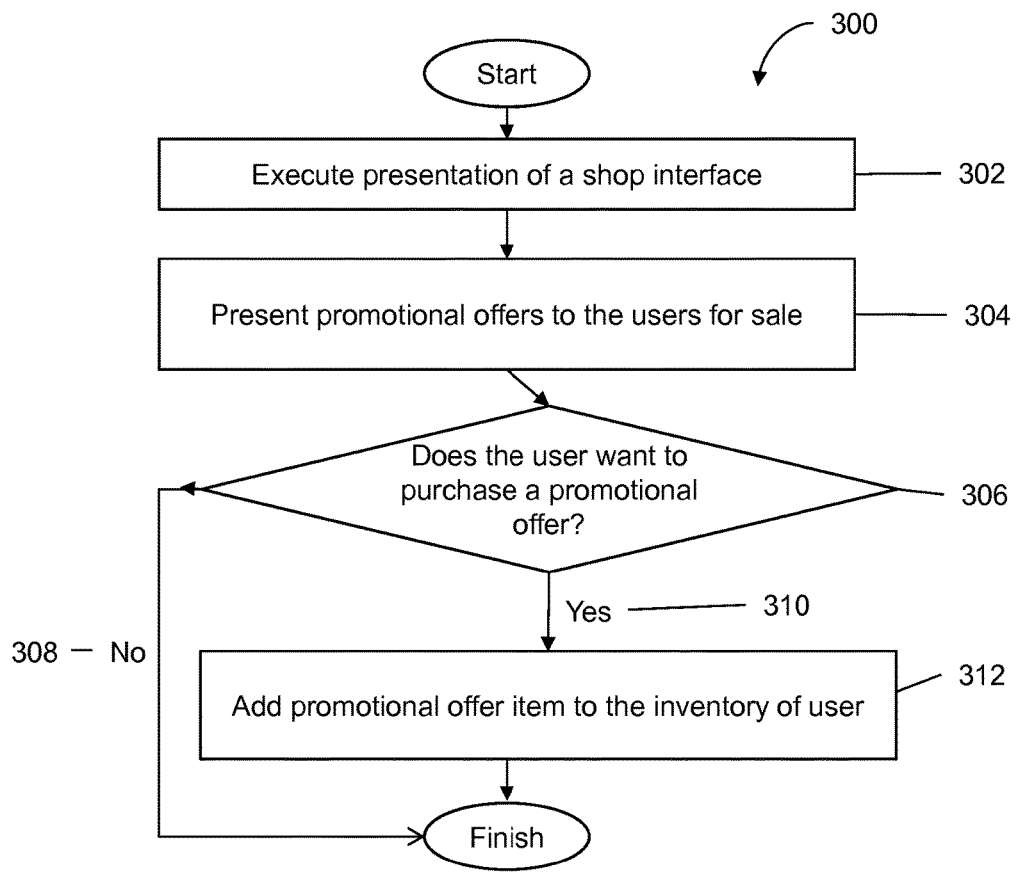
FIG. 3 illustrates a method for the sale of virtual items in promotional offers, in accordance with one or more implementations.

FIG. 3 illustrates a method 300 for the sale of virtual items in promotional offers. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a shop interface is presented to users. Operation 302 may be performed by a component that is the same as or similar to shop component 116, in accordance with one or more implementations.

At an operation 304, the determined promotional offers are offered to the users for acceptance. Operation 304 may be performed by a component that is the same as or similar to shop component 116, in accordance with one or more implementations.

At an operation 306, a determination is made as to whether the user wishes to purchase the promotional offer. If the user does not wish to purchase the promotional offer 308 the process 300 finishes. If the user does wish to purchase the promotional offer 310, the user pays for the item by any type of payment method that is appropriate to the game and the item. Operation 306 may be performed by a component that is the same as or similar to shop component 116, in accordance with one or more implementations.

At an operation 312, the virtual item in the promotional offer accepted by the user is added to the user's inventory for future use. Operation 312 may be performed by a component that is the same as or similar to user component 118, in accordance with one or more implementations.

Figure 4:
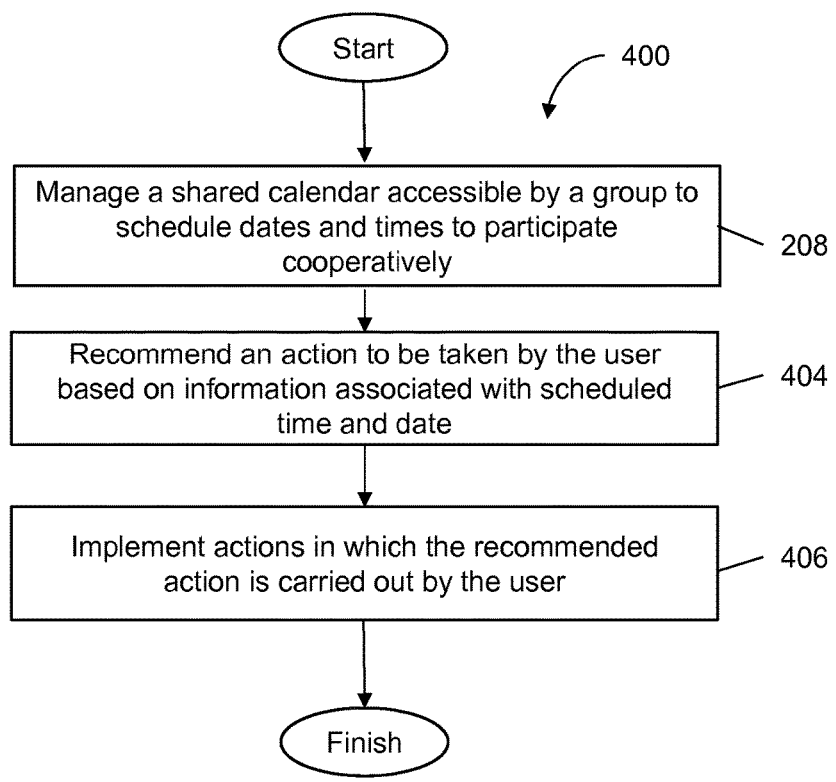
FIG. 4 illustrates a method for suggesting recommendations to users, in accordance with one or more implementations.

FIG. 4 illustrates a method 400 for suggesting recommendations to users. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 208, a shared calendar may be managed, which is accessible to a group to schedule dates and times at which at least a subset of the group of users intend to participate cooperatively in specific activities within the game. Operation 208 may be performed by a component that is the same as or similar to calendar component 110, in accordance with one or more implementations.

At an operation 404, an action is recommended to at least one of the group of users based on information associated with the scheduled dates and times in the shared calendar. This information may include an action intended to be taken, a number of users participating in the action, and/or one or more specific users planning to participate in the action. Operation 404 may be performed by a component that is the same as or similar to at least recommendation component 120, in accordance with one or more implementations.

At an operation 406, a recommended action is carried out by the user. Operation 406 may be performed by a component that is the same as or similar to at least game component 108, in accordance with one or more implementations.

Figure 5:
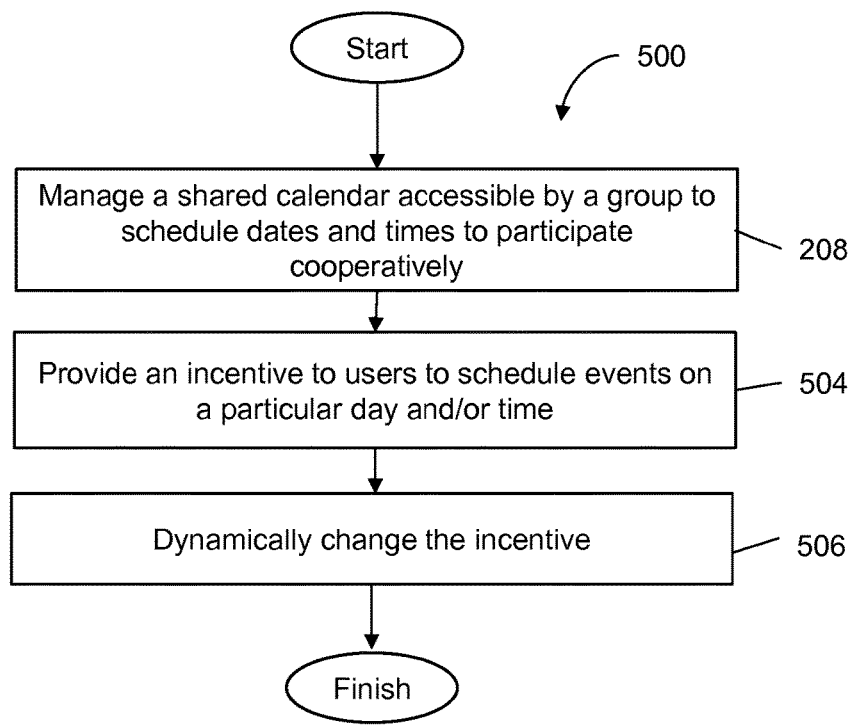
FIG. 5 illustrates a method for offering scheduling incentives for users, in accordance with one or more implementations.

FIG. 5 illustrates a method 500 for providing incentives to users to schedule events on particular dates and/or times. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 208, a shared calendar may be managed, which is accessible to a group to schedule dates and times at which at least a subset of the group of users intend to participate cooperatively in specific activities within the game. Operation 208 may be performed by a component that is the same as or similar to calendar component 110, in accordance with one or more implementations.

At an operation 504, an incentive is provided for users to schedule activities on a particular calendar day and/or at a particular time. Operation 504 may be performed by a component that is the same as or similar to scheduling incentive component 122, in accordance with one or more implementations.

At an operation 506, the incentive may be dynamically changed. The dynamic change may be based on characteristics of an activity that was scheduled to obtain the incentive. These characteristics may include the number of users agreeing to and/or actually did participate in the scheduled activity, the specific users that agreed to and/or did participate in the scheduled activity, the type of activity, and/or the percentage of users that committed to participate in the activity that actually participated in the activity. Operation 506 may be performed by a component that is the same as or similar to scheduling incentive component 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for in-game calendar-based item promotion, the system comprising:
one or more physical computer processors configured by machine-readable instructions to:
execute an instance of a multiplayer online game to facilitate participation in the multiplayer online game by users via client computing platforms, and to implement in-game actions in the instance of the multiplayer online game in response to action requests for the in-game actions input by the users to the client computing platforms, wherein execution of the instance of the multiplayer online game facilitates multiple users to participate cooperatively in the multiplayer online game at the same time;
manage a shared calendar that is accessible by a group of users participating in the multiplayer online game to schedule dates and times at which at least a subset of the group of users intend to participate cooperatively in specific activities within the multiplayer online game, the shared calendar providing individual users within the group of users with access to availability of other users within the group, and wherein a first date and a first time at which at a first subset of the group of users intend to participate cooperatively in the first scheduled activity are scheduled via the shared calendar;
determine promotional offers to sell one or more virtual items useable within the online game by in-game characters for the specific activities scheduled, wherein the promotional offers that are to be extended to one or more of the users in the group of users are based on a quantity of the first subset of the group of users who actually participate in the first scheduled activity, on virtual inventory items of in-game characters of individual users, and on the specific activities scheduled via the shared calendar such that different promotional offers are offered to different users based at least in part on the virtual inventory items of the in-game characters of the individual users, wherein a first promotion offer for a first virtual item is determined based on the first scheduled activity and at least a first virtual inventory item of a first in-game character of a first user in the group of users, and wherein the first virtual item is usable by the first in-game character within the multiplayer online game for the first scheduled activity, and wherein a second promotion offer for a second virtual item is determined based on the first scheduled activity and at least a second virtual inventory item of a second in-game character of a second user in the group of users, the second virtual item is usable by the second in-game character within the multiplayer online game for the first scheduled activity, wherein the first virtual item and the second virtual item are different virtual items; and
effectuate presentation of the determined promotional offers to the users in the group of users including effectuating presentation of the first promotional offer to one or more of the users in the group of users.

2. The system of claim 1, wherein the one or more physical processors are further configured to effectuate presentation to the users of a shop interface through which users can accept presented offers to sell virtual items usable in the multiplayer online game to the users, the presented offers comprising the determined promotional offers.

3. The system of claim 1, wherein the one or more physical processors are further configured to manage inventories of virtual items under the control of the users, the inventories including a first inventory of one or more virtual items under control of a first user in the multiplayer online game, the first inventory including the first virtual inventory item, wherein responsive to the first user accepting one of the determined promotional offers, a virtual item in the accepted offer being added to the first inventory.

4. The system of claim 1, wherein information is associated with the scheduled dates and times and comprises at least one of an action to be taken, a number of users participating in the action, and one or more specific users participating in the action.

5. The system of 4, wherein the information associated with the scheduled dates and times comprises the action to be taken, and the promotional offers are determined based on the action to be taken.

6. The system of claim 4, wherein the information associated with the scheduled dates and times comprises one or more specific users participating in the action, and the determined promotional offers are presented only to the specific users such that the information associated with the first scheduled activity comprises the first subset of users participating in the first scheduled activity and the first promotional offer is presented only to the first subset of users.

7. The system of claim 4, wherein the information associated with the scheduled dates and times comprises one or more specific users participating in the action, and wherein the one or more physical computer processors are configured to effectuate presentation of at least one of the determined promotional offers only to certain of the specific users.

8. The system of claim 4, wherein the one or more physical computer processors are further configured to recommend an action to be taken by at least one of the group of users based on the information associated with the scheduled dates and times.

9. The system of claim 1, wherein the one or more physical computer processors are configured to time presentation of the determined promotional offers based on the scheduled dates and times.

10. The system of claim 1, wherein the one or more physical computer processors are further configured to provide an incentive for users to schedule activities on a particular calendar day and/or at a particular time.

11. The system of claim 10, wherein the incentive dynamically changes depending on at least one of the number of users that participate in the scheduled event, the specific users that participate in the scheduled activity, the type of activity, and the percentage of users that committed to participate in the activity that actually participate in the activity.

12. A computer-implemented method for in-game calendar-based item promotion, the method being implemented in a computer system that includes one or more processors configured by machine-readable instructions, the method comprising:
executing an instance of a multiplayer online game to facilitate participation in the multiplayer online game by users;

implementing in-game actions in the instance of the multiplayer online game in response to action requests input by the users;

facilitating multiple users to participate cooperatively in the multiplayer online game at the same time;

managing a shared calendar that is accessible by a group of the users participating in the multiplayer online game to schedule dates and times at which at least a subset of the group of users intend to participate cooperatively in specific activities within the multiplayer online game, the shared calendar providing individual users within the group of users with access to availability of other users within the group, and wherein a first date and a first time at which at a first subset of the group of users intend to participate cooperatively in the first scheduled activity are scheduled via the shared calendar;

determining promotional offers to sell one or more virtual items useable within the online game by in-game characters for the specific activities scheduled, wherein the promotional offers that are to be extended to one or more of the users in the group of users are based on a quantity of the first subset of the group of users who actually participate in the first scheduled activity, on virtual inventory items of in-game characters of individual users, and on the specific activities scheduled via the shared calendar such that different promotional offers are offered to different users based at least in part on the virtual inventory items of the in-game characters of the individual users, wherein a first promotion offer for a first virtual item is determined based on the first scheduled activity and at least a first virtual inventory item of a first in-game character of a first user in the group of users, and wherein the first virtual item is usable by the in first in-game character within the multiplayer online game for the first scheduled activity, and wherein a second promotion offer for a second virtual item is determined based on the first scheduled activity and at least a second virtual inventory item of a second in-game character of a second user in the group of users, the second virtual item is usable by the second in-game character within the multiplayer online game for the first scheduled activity, wherein the first virtual item and the second virtual item are different virtual items; and effectuating presentation of the determined promotional offers to the users in the group of users including effectuating presentation of the first promotional offer to one or more of the users in the group of users.

13. The method of claim 12, further comprising effectuating presentation to the users of a shop interface through which users can accept presented offers to sell virtual items usable in the multiplayer online game to the users, the presented offers comprising the determined promotional offers.

14. The method of claim 12, further comprising managing inventories of virtual items under the control of the users, the inventories including a first inventory of one or more virtual items under control of a first user in the multiplayer online game, the first inventory including the first virtual inventory item, and responsive to the first user accepting one of the determined promotional offers, adding a virtual item in the accepted offer to the first inventory.

15. The method of claim 12, wherein information is associated with the scheduled dates and times and comprises at least one of an action to be taken, a number of users participating in the action, and one or more specific users participating in the action.

16. The method of 15, wherein the information associated with the scheduled dates and times comprises the action to be taken, further comprising determining the promotional offers based on the action to be taken.

17. The method of claim 15, wherein the information associated with the scheduled dates and times comprises one or more specific users participating in the action, further comprising presenting the determined promotional offers only to the specific users such that the information associated with the first scheduled activity comprises the first subset of users participating in the first scheduled activity and the first promotional offer is presented only to the first subset of users.

18. The method of claim 15, wherein the information associated with the scheduled dates and times comprises one or more specific users participating in the action, further comprising effectuating presentation of at least one of the determined promotional offers only to certain of the specific users.

19. The method of claim 15, further comprising recommending an action to be taken by at least one of the group of users based on the information associated with the scheduled dates and times.

20. The method of claim 15, further comprising timing presentation of the determined promotional offers based on the scheduled dates and times.

21. The method of claim 15, further comprising providing an incentive for users to schedule activities on a particular calendar day and/or at a particular time.

22. The method of claim 21, wherein the incentive dynamically changes depending on at least one of the number of users that participate in the scheduled activity, the specific users that participate in the scheduled activity, the type of activity, and the percentage of users that committed to participate in the activity that actually participate in the activity.

* * * * *

UNITED STATES PATENT AND TRADEMARK OFFICE
CERTIFICATE OF CORRECTION

PATENT NO. : 10,395,279 B1
APPLICATION NO. : 14/247946
DATED : August 27, 2019
INVENTOR(S) : Michael C. DeLaet Page 1 of 1

It is certified that error appears in the above-identified patent and that said Letters Patent is hereby corrected as shown below:

On the Title Page

Column 2, Item (56), Line 2, under Other Publications, delete "Retrieved of" and insert --Retrieved on--.

In the Claims

In Column 14, Line 21, Claim 5, delete "system of" and insert --system of claim--.

In Column 15, Line 36 (approx.), Claim 12, delete "the in" and insert --the--.

Signed and Sealed this
Twenty-sixth Day of November, 2019

Andrei Iancu
*Director of the United States Patent and Trademark Office*